United States Patent
Elder

[19]

[11] 3,909,699

[45] Sept. 30, 1975

[54] LOW IMPEDANCE TRANSMISSION LINE FOR BYPASSING RADIO FREQUENCY ENERGY AROUND HIGH VOLTAGE RECTIFIER STACKS

[75] Inventor: Frederick A. Elder, Rancho Palos Verdes, Calif.

[73] Assignee: International Rectifier Corporation, Los Angeles, Calif.

[22] Filed: Sept. 25, 1974

[21] Appl. No.: 509,102

[52] U.S. Cl. .................. 321/11; 325/185; 357/76
[51] Int. Cl.² .......................................... H02M 1/18
[58] Field of Search ........... 357/76, 77; 317/44, 45, 317/256; 325/185; 321/8 R, 11, 27 R; 307/252 L

[56] References Cited
UNITED STATES PATENTS 3,749,983  7/1973  Beriger ........................... 357/76

3,811,084  5/1974  Shimu et al. ........................... 321/11

FOREIGN PATENTS OR APPLICATIONS 681,911  3/1964  Canada ................................ 321/11

Primary Examiner—William H. Beha, Jr.
Attorney, Agent, or Firm—Ostrolenk, Faber, Gerb & Soffen

[57] ABSTRACT

A low impedance transmission line consisting of substantially coextensive, thin conductive straps which overlap one another, and are connected to respective opposite terminals of a high voltage rectifier stack, bypasses RF energy from a radio frequency transmitter connected to the high voltage rectifier stack around the stack to prevent damage to the stack diodes.

9 Claims, 9 Drawing Figures

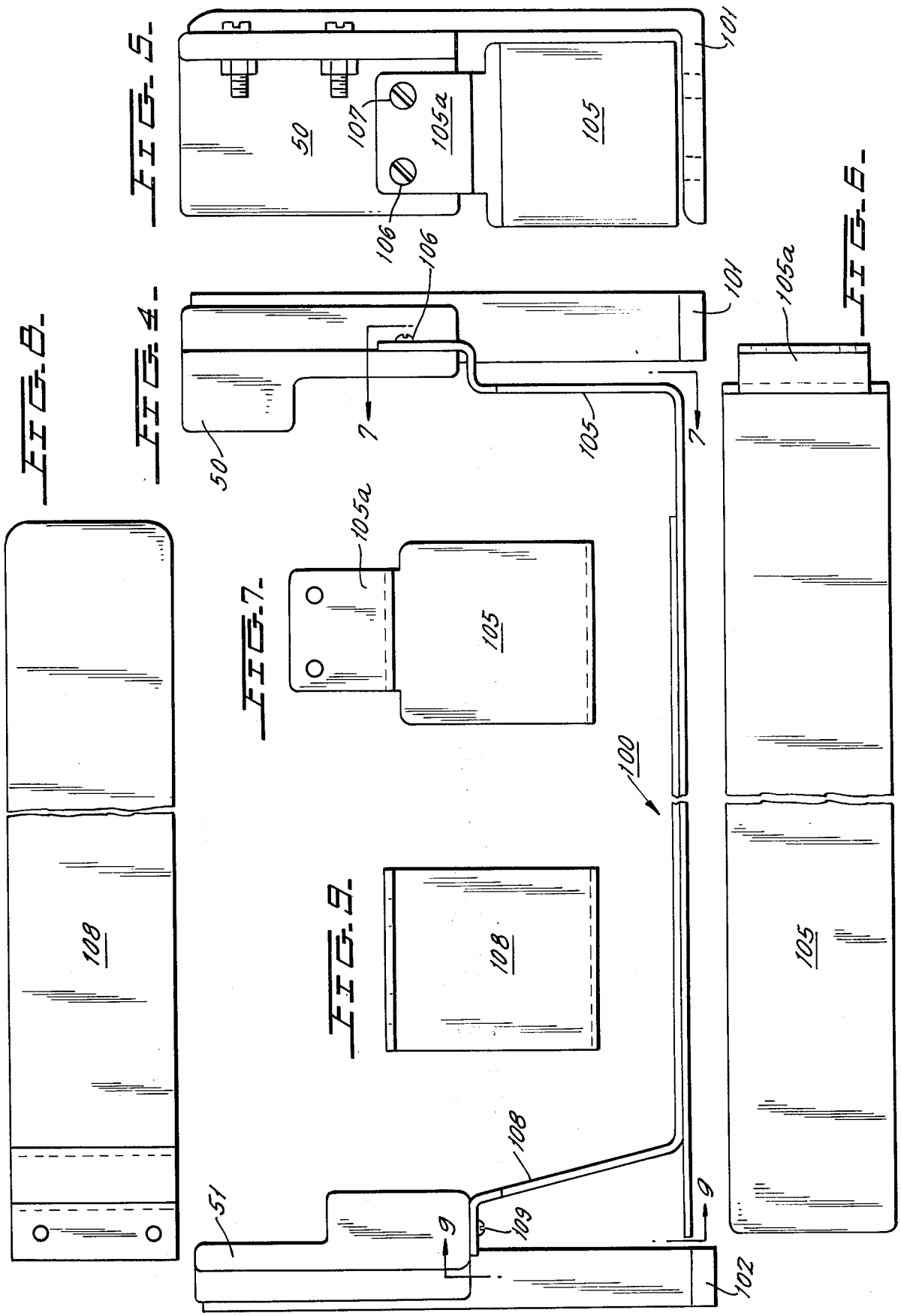

LOW IMPEDANCE TRANSMISSION LINE FOR BYPASSING RADIO FREQUENCY ENERGY AROUND HIGH VOLTAGE RECTIFIER STACKS

BACKGROUND OF THE INVENTION

This invention relates to high voltage rectifier stacks composed of a plurality of series-connected diodes, and more particularly relates to a novel low impedance transmission line connected in parallel with such a stack in order to bypass radio frequency energy around the stack.

High voltage rectifier stacks are well known, wherein a large plurality of diodes are connected in series with one another to produce an extremely high voltage assemblage for rectifying very high a-c voltages in order to produce a very high d-c voltage. Rectifier stacks of this type are shown, for example, in U.S. Pat. No. 3,217,210, dated Nov. 9, 1965, in the name of E. J. Diebold, entitled HIGH VOLTAGE RECTIFIER STRUCTURE and assigned to the assignee of the present invention. These stacks are made up of individual modules which may each contain an individual diode or other semi-conductor device which has the ability of rectifying a-c current along with parallel-connected capacitors and resistors associated with that individual diode and connected in parallel therewith. These modules may contain their own conductive shield, and are assembled on a support member, with the modules being electrically connected in series with one another between two main terminals of the assemblage. These assemblages are commonly used to provide high d-c voltage for the so-called B+ supply of high frequency transmitters for radar systems and the like.

The use of solid state rectifier elements has permitted the construction of the relatively small and inexpensive power supplies as compared to vacuum tubes and gas-filled tubes which were used before solid state devices were available. When high voltage stacks of this type are used as the power supply of a high power, high frequency transmitter, the individual diodes of the stack frequently experience mysterious failures even though there were no transients, overloads or other apparent causes for failure of the devices. These failures are now believed to be due to radio frequency energy leakage from the transmitter and across the d-c terminals of the rectifier stack. This was not a problem with prior art types of rectifying equipment, such as gas-filled tubes or vacuum tubes because these devices formed a relatively large impedance in the return path for such RF leakage energy, so that bypass capacitors in the transmitter performed adequately and the RF leakage across the rectifier tubes was dissipated in the power lead capacitance to ground and across the high impedance tubes.

When using the solid state rectifier stack, however, it is necessary to attempt to provide a capacitance bypass or low impedance bypass around the stack since the RF leakage power could lead to failure of various diodes in the stack. Thus, it is common to provide a capacitor in shunt with the entire stack.

When using a capacitor in this manner, great care must be taken to properly trim the capacitor leads to a proper length since these capacitors at the very high frequencies involved will have substantial inductance. Thus, the longer the leads, the lower the frequency at which the capacitor will serve as an effective bypass. There is an obvious limit to how short these leads can be made so that there is also a limit to the size capacitor which can be used as an RF bypass.

A further problem exists where the transmitter is a high band TV transmitter, as for Channels 7 to 13, or in the UHF band of 450 megahertz and above. Thus, using a conventional capacitor with leads adjusted to serve a bypass function at these frequencies, it is possible to adequately bypass RF voltage at one end of the stack, but high voltages will appear only a few inches away from this point and, for example, at multiples of ¼ wavelength intervals along the device.

BRIEF DESCRIPTION OF THE PRESENT INVENTION

In accordance with the present invention, the bypass capacitor of a high voltage rectifier stack which is to be used in connection with radio frequency equipment is provided with a low impedance transmission line for bypassing radio frequency energy around the stack wherein the transmission line consists of closely spaced overlapping conductors connected to the opposite terminals of the stack. The arrangement thus defines a very low impedance transmission line in which the capacitance of the line increases as its inductance increases. Thus, there is no need in the device to trim capacitors leads to length as in the prior art arrangements, and the novel transmission line can take the form of inexpensive conductive straps which are insulated from one another and secured to one another in any desired manner.

The present invention differs from prior art arrangements in which shields are provided to ensure a predetermined coupling of capacitance to ground along the length of the stack. Arrangements of this type are shown in U.S. Pat No. 3,676,762, where conductive members are not in close proximity to one another and where the devices would not serve the function of an effective high power RF bypass.

The invention is also distinguished from arrangements such as that shown in U.S. Pat. No. 3,613,033 in which overlapping conductive members are used as an element of a low-pass filter in combination with an integral inductor. That is to say, the transmission line of the present invention is designed to cooperate directly with a high voltage rectifier stack and not as a subassembly component.

In carrying out the present invention, the transmission line conductors can take any desired form and can, for example, consist of a silver plated large diameter copper tubes which are nested within one another, with their opposite ends connected to the opposite terminals of a high voltage rectifier stack. The adjacent surfaces of the tubes would then be appropriately insulated from one another.

In the preferred embodiment of the invention, the transmission line takes the form of relatively wide, thin conductor straps which may be of copper, aluminum or silver or any other desired low-resistance material which is insulated by being wrapped or coated with a suitable, thin insulating material and then are held together with relatively low spacing between them. Other pairs of similar parallel straps could also be used to provide an even lower impedance bypass for the rectifier stack.

BRIEF DESCRIPTION OF THE DRAWINGS

FIG. 4 is a plan view of the assembly of FIG. 2.

FIG. 5 is an end view of FIG. 4.

FIG. 6 is a top view of one of the transmission line elements shown in FIGS. 4 and 5.

FIG. 7 is an end view of FIG. 6 as seen from line 7—7 in FIG. 4.

FIG. 8 is a plan view of the other of the transmission line conductive straps of FIG. 4.

FIG. 9 is an end view of FIG. 8 as seen from line 9—9 in FIG. 4.

DETAILED DESCRIPTION OF THE DRAWINGS

Figure 1:
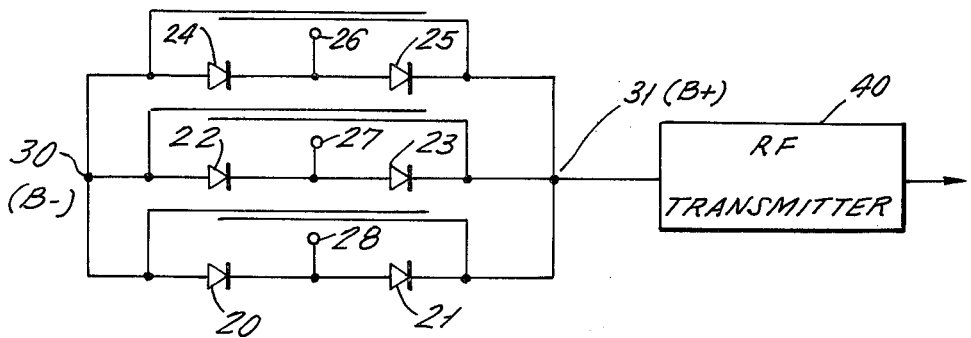
FIG. 1 is a schematic diagram of a three-phase, bridge-connected rectifier which uses three high voltage stacks which is coupled to an RF transmitter.

Referring first to FIG. 1, there is illustrated therein a three-phase, bridge-connected rectifier stack which consists of bridge arms 20—21, 22—23, and 24—25 for the three phases, respectively. Each of the schematically illustrated diodes 20 to 25 will in actuality correspond to a large plurality of series-connected diode elements which are needed in order to obtain an extremely high reverse voltage capability for the high voltage stack. Each of the stacks 20 to 25 are conventionally formed by individual two-terminal diodes, but it will be understood by those skilled in the art that the term "diode", as used herein, will also include any type of device which has rectification capability such as a thyristor and the like.

Three a-c terminals 26, 27 and 28 are then connected to the junctions between diode stack pairs 20—21, 22—23 and 24—25, respectively. The anodes of stacks 20, 22 and 24 are then connected to one another and to a first terminal 30 which may be termed a B- terminal while the cathodes of terminals 21, 23 and 25 are connected to a second device 31 which can be termed a B+ terminal. The B+ terminal 31 is then appropriately connected to an RF transmitter 40 of any desired type which uses the d-c power of the stack previously described to drive its various tubes and the like. As pointed out previously, RF energy from the RF transmitter 40 cam leak back into the power supply between terminals 30 and 31 and cause damage to the individual components which make up the stacks 20 to 25.

The present invention provides a novel low impedance transmission line connected across each of the pairs of stacks 20—21, 22—23 and 24—25, respectively, to prevent the appearance of RF energy across the stack.

Figure 2:
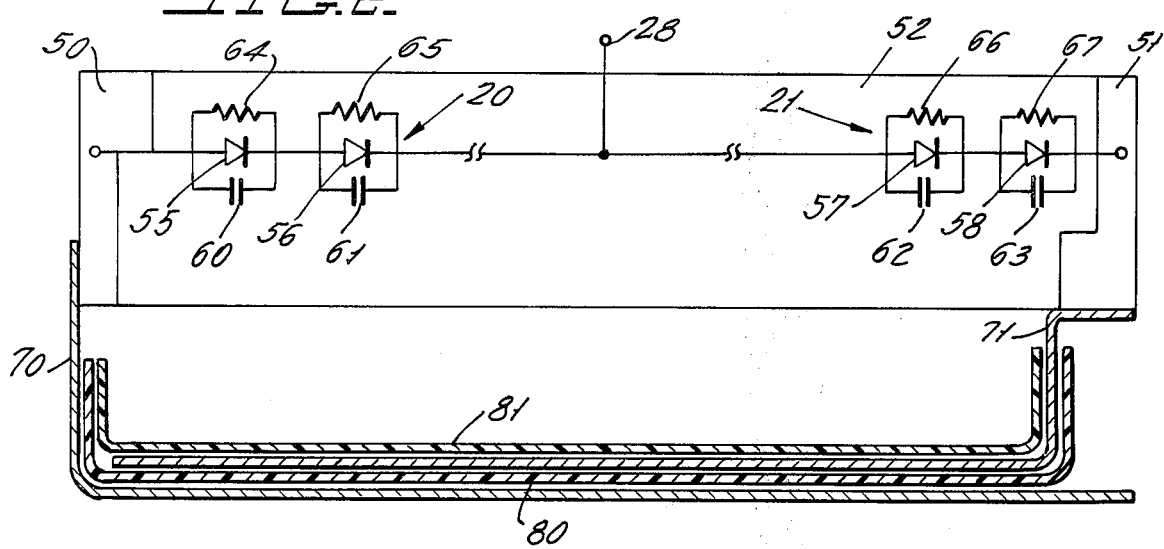
FIG. 2 schematically illustrates one of the stacks of FIG. 1 along with its parallel-connected, low impedance transmission line which is shown in cross-sectional view.

FIG. 2 schematically illustrates two of the arms 20 and 21 of the bridge of FIG. 1 along with its a-c input terminal 28 and metallic end terminals 50 and 51 of a support board 52 which carries the various diode elements. Thus, arm 20 consists of a plurality of diode elements schematically illustrated by diodes 55 and 56, where in actuality 50 diodes could be provided on the board. Similarly, arm 52 contains a large number of diodes schematically illustrated as diodes 57 and 58.

All of the diodes 55 to 58 are connected in series with one another and are connected between terminals 50 and 51 which constitute the B- and B+ terminals, respectively. The support board 52 can also carry parallel capacitors and resistors for each of the diodes, shown as capacitors 60 to 63 and resistors 64 to 67 for the diodes 55 to 58, respectively. Capacitors 60 to 63 serve the well-known function of voltage spike suppression capacitors while resistors 64 to 67 serve the well known function of reverse voltage distributing devices.

In accordance with the invention, a low impedance transmission line is formed by conductive straps 70 and 71 which are insulated from one another but which coextensively overlap one another and are connected to terminals 50 and 51, respectively. Note that the outer strap 70 is connected to the B= terminal 50 which is frequently a grounded terminal so that the grounded plate faces outwardly of the assembly. The strap or plate 71 is the high voltage strap or plate and will have its edges rounded to prevent corona discharge. The plate 71 typically can be from 2 inches to 6 inches wide and may have a length, for example, of 12 inches.

In order to insulate straps or plates 70 and 71, a dielectric coating or winding is formed on either or both of plates 70 and 71. By way of example, an insulation layer 80 may be formed on the outer surface of plate 71 and a similar insulation shield 81 can be formed on the interior surface of plate 71. These insulation shields can be a dielectric tape wrapped around plate 71 and the dielectric thickness and material will be selected to be appropriate for the particular voltages which are involved. Typically, a layer of tape formed of mica or mylar kapton or some similar material is wrapped on the plate 71 and the two plates 70 and 71 can be taped together by a second layer of tape. Thus, the two plates 70 and 71 are fixed in close proximity to one another and are separated by the insulating medium. After the plates 70 and 71 are wrapped, then can be vacuum impregnated with insulation and dipped or baked in an epoxy, for example, to provide a stable enclosure.

Figure 3:
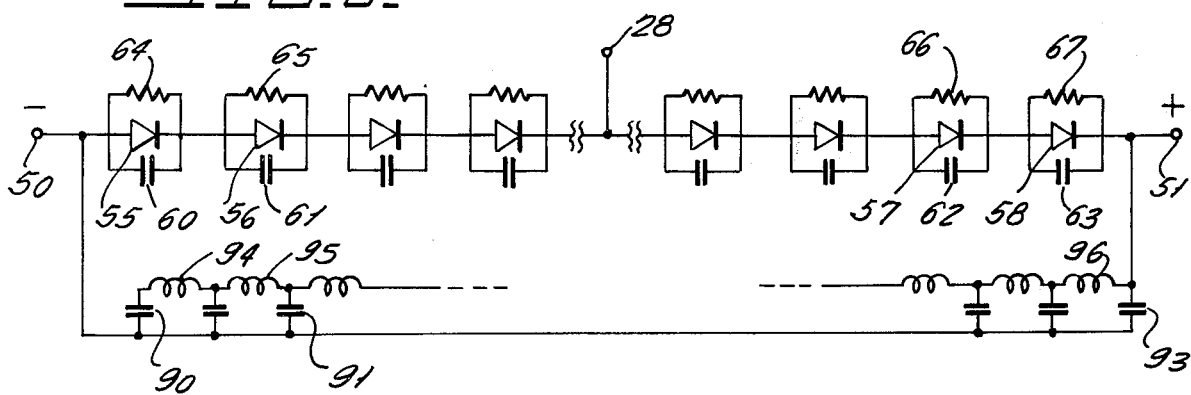
FIG. 3 is a circuit diagram of the circuit and structure of FIG. 2.

FIG. 3 shows an equivalent circuit diagram of the transmission line formed of plates 70 and 71 in FIG. 2 along with the diode assembly. Thus, in FIG. 3, the plates 70 and 71 are represented by a plurality of capacitors including capacitors 90, 91 and 93 along with unit inductance elements, such as inductance elements 94, 95 and 96. When using elongated plates 70 and 71 of FIG. 2 to form the low impedance transmission line, the inductance will increase as the capacitance of the plates increases, thereby to eliminate the prior art needed for adjustment of lead length of the conventional capacitor. Indeed, in the present invention, the capacitor leads define the capacitor plates of the transmission line. FIGS. 4 to 9 illustrate a preferred embodiment for the transmission line schematically illustrated in FIGS. 2 and 3. Thus, in FIG. 4, the high voltage stack is schematically illustrated by dot-dash lines as the stack 100 contained between conductive end terminals 50 and 51.

A pair of support brackets 101 and 102 are then provided to enable the mounting of the assembly to a suitable support surface. The outer grounded transmission line plate 105, corresponding to plate 70 of FIG. 2, is then secured to electrode 50 as by the screws 106 and 107 (FIG. 5), while the inner and high voltage plate 108, corresponding to plate 71 of FIG. 2, is connected mechanically and electrically to the terminal 51 by screws such as the screw 109 in FIG. 4.

Plates 105 to 108 are precoated with a dielectric film and are then held together with their ends being prespaced to conform to the spacing between terminals 50 and 51 and the plates are mechanically secured together by an over-coating of film or by an overlap of an insulation tape. Thus, a transmission line is formed which extends from the terminal 50 to the terminal 51, thereby providing a high frequency bypass around the stack 100.

In the preferred embodiment of the invention, plates 105 and 108 take the form of elongated straps as shown in FIGS. 6 to 9. Thus, FIGS. 6 and 7 show the elongated strap shaped plate 105 as being relatively thin, for example, 0.093 inches thick aluminum which is about two inches wide and about seventeen inches in length. One end of plate 105 is bent upwardly to define the upwardly extending leg 105a which is utimately connected to the terminal 50. The plate 108, as shown in FIGS. 8 and 9, is also of 0.093 inch thick aluminum and has a width of about 1½ inches and a length of about 15 inches. Both the elongated plates 105 and 108 are formed to be free of sharp edges and burrs and all corners have a smooth radii to prevent the formation of points at which corona discharge can be initiated.

The plates 105 and 108, as pointed out previously, can also take other forms and could, for example, be formed of telescoping conductive tubes which could, if desired, enclose the stack with which they are associated.

If desired, the plates 105 and 108 can be made of conductive material having a given electrical resistance, such as iron, or steel, or the like. The resistance characteristic of these materials would be useful for dissipating energy trapped in inductive components of the system, such as transformers and the like, when the rectifier is fed from an inverter type power supply having a square wave output. The inverter controlled rectifiers or transistors periodically shut off so that energy is trapped in the inductive components, thereby developing high energy pulses. These pulses are normally dissipated in parallel resistors for each semiconductor device, and is reduced by capacitors in parallel with the semiconductor devices. However, when there are a great number of series-connected devices, and consequently a great number of individual capacitors, the total series capacitance of the stack is reduced to a small value. The novel spaced conductor arrangement of the invention fills the need for additional capacity to absorb these pulses, and dissipates their energy in the conductor resistance.

Although there has been described a preferred embodiment of this invention, many variations and modifications will now be apparent to those skilled in the art. Therefore, this invention is to be limited, not by the specific disclosure herein, but only by the appended claims.

I claim:

1. In combination, a low impedance transmission line and a high voltage rectifier stack; said high voltage rectifier stack comprising a plurality of series-connected diodes extending between first and second spaced terminals, and a mounting support for mounting said plurality of diodes and said first and second terminals; said first and second terminals being positioned at opposite ends of said mounting support; said low impedance transmission line comprising first and second thin, elongated, closely spaced conductors each having a terminal end and a free end; said terminal ends of said first and second conductors being electrically connected to and mechanically supported by said first and second terminals respectively; said free ends of each of said first and second conductors terminating just short of the terminal end of the other, whereby said first and second conductors are substantially coextensive with one another and define a low impedance transmission line in parallel with said rectifier stack.

2. The combination of claim 1 which further includes a respective parallel-connected resistor and capacitor for each of said plurality of diodes.

3. The combination of claim 1 which further includes a radio-frequency transmitter connected to said high voltage rectifier stack.

4. The combination of claim 2 which further includes a radio-frequency transmitter connected to said high voltage rectifier stack.

5. The combination of claim 1 wherein said first and second thin, closely spaced conductors each comprise flat elongated straps which are disposed face-to-face with one another.

6. The combination of claim 5 wherein each of said straps are covered with insulation material and are spaced from one another by a distance equal to the total thickness of said insulation material on opposing surfaces of said straps.

7. The combination of claim 5 which further includes a respective parallel-connected resistor and capacitor for each of said plurality of diodes.

8. The combination of claim 7 which further includes a radio-frequency transmitter connected to said high voltage rectifier stack.

9. The combination of claim 1 wherein said first and second conductors are made of a material having a resistance greater than the resistance of a copper conductor.

* * * * *